United States Patent [19]

Reneau

[11] Patent Number: 4,980,526

[45] Date of Patent: Dec. 25, 1990

[54] DEVICE AND METHOD FOR TESTING ACCELERATION SHOCK SENSORS

[75] Inventor: Daniel R. Reneau, Madison, Wis.

[73] Assignees: Hamlin Incorporated, Lake Mills, Wis.; Daimler-Benz, AG, Fed. Rep. of Germany

[21] Appl. No.: 334,310

[22] Filed: Apr. 6, 1989

[51] Int. Cl.$^5$ .................... H01H 35/14; H01H 51/00; G01R 31/02

[52] U.S. Cl. .................. 200/61.45 M; 200/61.53; 335/151

[58] Field of Search ............... 200/61.45 R, 61.53; 335/205–207, 256, 266, 151

[56] References Cited

U.S. PATENT DOCUMENTS

| | | | |
|---|---|---|---|
| 2,963,563 | 12/1960 | Patterson | 200/81.9 M |
| 2,976,378 | 3/1961 | Goddard | 200/61.45 R |
| 3,057,977 | 10/1962 | Caswell | 200/81.9 M |
| 3,097,272 | 5/1962 | Hautly | 200/61.49 |
| 3,327,079 | 6/1967 | Widl | 200/82 R |
| 3,412,391 | 11/1968 | Ward | 340/690 |
| 3,459,911 | 8/1969 | Fischer | 200/61.53 X |
| 3,737,599 | 6/1973 | Zuvela | 200/61.45 R |
| 3,795,780 | 3/1974 | Lawrie | 200/61.45 R |
| 3,853,199 | 12/1974 | Hirashima et al. | 180/274 |
| 3,945,459 | 3/1976 | Oishi et al. | 180/274 |
| 4,016,535 | 4/1977 | Oinlocker | 340/440 |
| 4,081,635 | 3/1978 | Moore | 200/81.9 M |
| 4,087,782 | 5/1978 | Oishi et al. | 180/271 |
| 4,093,836 | 6/1978 | Ewy et al. | 200/61.53 |
| 4,181,835 | 1/1980 | Stadler et al. | 200/82 E |
| 4,484,041 | 11/1984 | Andres et al. | 200/61.45 M |
| 4,518,835 | 5/1985 | Grossar | 200/61.45 M |
| 4,596,971 | 5/1986 | Hirabayashi et al. | 335/205 |
| 4,639,563 | 1/1987 | Gunther | 200/61.45 M |
| 4,705,922 | 11/1987 | Seeger et al. | 200/61.45 M |
| 4,827,091 | 5/1989 | Behr | 200/61.45 M |
| 4,922,065 | 5/1990 | Behr et al. | 200/61.45 M |

Primary Examiner—J. R. Scott
Attorney, Agent, or Firm—Lathrop & Clark

[57] ABSTRACT

A testing device (11) is applied to an acceleration shock sensor (10) of the type having a reed switch (24) that operates such that the net mass of a magnet (40) is accelerated against a spring (50) upon vehicle impact or rapid deceleration of the vehicle. The change in magnet (40) position causes a change in the magnetic field that activates the reed switch (24). The testing device (11) includes an electromagnetic coil (90) mounted in an area of minimal reed switch (24) sensitivity. The electromagnetic coil (90) is connected to be capable of providing a current flow that creates a magnetic field that opposes the magnetic field of the magnet (40). Upon energizing of the coil (90), the magnet (40) is urged to accelerate in a manner that emulates the acceleration of the magnet (40) caused by vehicle collision.

28 Claims, 4 Drawing Sheets

ACCELERATION FORCE →

DEVICE AND METHOD FOR TESTING ACCELERATION SHOCK SENSORS

FIELD OF THE INVENTION

This invention relates to a means for testing shock sensors that employ magnetic reed switches activated upon acceleration of sufficient magnitude.

BACKGROUND OF THE INVENTION

Shock sensors have been used in motor vehicles to detect a vehicle collision and to activate an electronic circuit for the actuation of safety devices, such as to tension safety belts, to inflate air bags, to shut off fuel systems, to activate radio signals, or to actuate other desired systems. Such shock sensors typically employ a reed switch having ferromagnetic contacts and operate such that the mass of a magnet is accelerated by vehicle impact against a restoring force such as a wire spring or repelling magnet. A change in magnet position causes a change in the magnetic field relative to reed switch sensitivity. The change in magnetic field therefore acts as a means for operating the reed switch contacts.

The shock sensors that employ reed switches typically have a housing that encloses a magnet that slidably travels between a first abutment and a second abutment. See, e.g., U.S. Pat. Nos. 4,484,041 and 4,639,563 issued to Andres et al., and Gunther, respectively. The magnetic reed switch is positioned within the shock sensor so that the reed switch is activated by the change in magnetic field exerted upon the reed switch by the magnet as the magnet travels from the first abutment to the second abutment and back again. The magnet is biased away from the second abutment by a spring or other biasing means.

In an exemplary use, the shock sensor may be mounted in a vehicle with the second abutment oriented forwardly so as to detect a vehicular collision from the front of the vehicle. In such a case, the vehicle and the housing of the sensor would be subject to rapid deceleration resulting from the collision, and the mass of the magnet of the sensor would overcome the biasing means to accelerate relative to the housing toward the second abutment.

Because it is critical to actuate safety devices under emergency conditions resulting from a collision, it is necessary to test the movement of the magnet and electrical operation of the reed switch. The prior art shows a test of the reed switch accomplished by winding an electromagnetic coil around the reed switch, and thereby applying a magnetic field that activates the reed switch in order to test the reed switch. See Zuvela, U.S. Pat. No. 3,737,599. Such a testing device does not, however, test the functional status of the required movement of the magnet against the biasing means. This is accomplished in the prior art by a random sampling of the shock sensors in actual crash conditions, a method inadequate to check the entire lot of shock sensors in any repeatable fashion.

SUMMARY OF THE INVENTION

In accordance with the present invention, a device for the self-testing of acceleration shock sensors uses an electromagnetic coil, located in a region of minimal reed switch sensitivity, to provide an opposing magnetic field to the slidable magnet. The opposing magnetic field urges the magnet to accelerate toward the second abutment in a similar manner to the acceleration of the magnet caused by vehicle impact. Thus, as in the case where the sensor is subjected to rapid deceleration resulting from a vehicle collision, the reed switch is activated by the change in magnetic field exerted upon the reed switch by the magnet as the magnet travels from the first abutment to the second abutment and back again. The magnetic field applied by the electromagnetic coil can be controlled by the coil current pulse to represent vehicle impact acceleration while reed switch operation is monitored. The electromagnetic coil is positioned so that the reed switch sensitivity would remain basically unaffected by the coil field so that a complete test of inertial response to acceleration force against the biasing means would operate the reed switch as though the acceleration came from vehicle impact.

The testing device of the present invention may be used to activate the shock sensor after manufacture at the factory to test viability of the sensor. Additionally, the testing device may be set up so that the driver of the vehicle in which the shock sensor is installed may periodically test the sensor by turning a switch of some kind. The testing device may be alternately used so that the testing is automatically performed, e.g., upon the turning of the ignition switch or the starting of the engine. A warning light may then be turned on in the event of failure of the shock sensor.

The present invention thus serves as a means of testing both movement of the magnet and electrical operation of the reed switch. The present invention is repeatable and does not require an actual collision to test the movement of the magnet in response to anticipated acceleration forces.

Further objects, features, and advantages of the invention will be apparent from the following detailed description taken in conjunction with the accompanying drawings.

DESCRIPTION OF THE PREFERRED EMBODIMENT

With reference to the drawings, a shock sensor is shown generally at 10 that includes a testing device 11 of the present invention. The shock sensor 10 as depicted in the figures is meant to be exemplary of shock sensors that employ magnetic reed switches which are activated when the sensor is subjected to acceleration forces of substantial magnitude. The shock sensor 10 typically includes a capsule 12 having a housing 14 that defines a cavity 16 that surrounds a horizontal reed switch compartment in the preferred form of a pipe 18.

The interior of the housing 14 is bounded by a first abutment 20 and a second abutment 22, the pipe 18 extending between the abutments 20 and 22. Mounted within the pipe 18 is a reed switch 24 having contact blades 26 and 28, normally in the open position. The contact blades 26 and 28 are electrically connected with switch terminals 30 and 32, respectively. A tubular magnet 40 is slidably mounted upon the pipe 18, the magnet 40 having a first end 36 and a second end 38. The magnet 40 is oriented within the cavity 16 so that the first end 36 of the magnet faces the first abutment 20 and a second end 38 of the magnet faces the second abutment 22. The magnet 40 has north and south poles in horizontal orientation facing abutments 20 and 22. The magnet 40 has a notch 48 that allows a spring 50 to fit therein, the spring 50 fitting around the pipe 18 and within the notch 48. The spring 50 ordinarily biases the magnet 40 such that the first end 36 is positioned away from the second abutment 22.

The testing device 11 comprises an electromagnetic coil 90 positioned outside of the capsule 12 against the housing 14 adjacent the first abutment 20. The coil 90 comprises a spool 91 having windings 93 that are wound circumferentially about the spool 91. The coil 90 is typically made of non-magnetic material, e.g. copper, so that the coil 90 will not affect sensor 10 operation when not given electrical current. The coil 90 has a first end 92 and a second end 94, the first end 92 being positioned outside the housing 14 adjacent the first abutment 20 and the second end 94 opposing the first end 92. The electromagnetic coil 90 is capable of providing a current flow that would create a magnetic field so that the orientation of the poles of the magnetic field along the axis of the coil 90 is such that a repulsive force against the magnet 40 is created when the coil 90 is energized by a trigger voltage. Trigger voltage is introduced to the coil 90 through leads 96 of the windings 93 attached to terminals 98. With current applied, the coil develops a magnetic field that, by design, is shaped in strength and oriented to oppose the magnetic field of the magnet 40. For example, if the magnet 40 is oriented so that the south pole of the magnet faces the first abutment 20 and the north pole of the magnet 40 faces the second abutment 22, the current flow in the coil 90 must be such that the south pole of the magnetic field is created at the first end 92 of the coil and the north pole of the field is created at the second end 94. When a trigger voltage is applied to the coil 90, a repulsive force is established between the magnet 40 and the magnetic field produced by the electromagnetic coil 90. It would be possible therefore for the poles of the magnet 40 and those of the magnetic field produced by the coil 90 to both be reversed, so long as a repulsive force is created between the magnet 40 and the field of the coil 90 upon energizing of the coil 90. The position of the coil 90 is a position of minimal reed switch sensitivity so that energizing the coil 90 will not affect the contacts 26 and 28 of the reed switch 24.

The shock sensor 10, as embodied in the figures, is used to sense a deceleration force applied against the housing 14 in a direction from generally the second abutment 22 toward the first abutment 20. Under circumstances of a collision, the housing 14 of the shock sensor 10 and a vehicle in which the sensor 10 is mounted would be subject to the rapid deceleration in the direction just described; however, when the device 10 is subject to such deceleration, the magnet 40 would be accelerated relative to the housing 14 in the direction from the first abutment 20 to the second abutment 22. The magnet 40 is biased away from the second abutment 22 and against the first abutment 20 by the spring 50. When a vehicle collision occurs, the acceleration force of the magnet 40 overcomes the biasing of the spring 50 and the magnet 40 is urged toward the second abutment 22. The spring 50 has a spring constant such that the biasing is overcome at an acceleration force of pre-selected magnitude. As the magnet 40 moves above the contacts 26 and 28 of the reed switch 24, the normally open reed switch 24 is closed by the magnetic field of the magnet 40 acting upon the contacts 26 and 28. The exact point of activation of the reed switch 24 depends upon the strength of the magnet 40 and the sensitivity of the contacts of the reed switch 24. The activation point is thus pre-selected by the design criteria. The magnet 40 will continue traversing across the pipe 18 toward the second abutment 22 until a maximum acceleration force is experienced by the magnet 40. As the acceleration force diminishes, the magnet 40 returns toward the first abutment 20, past the pre-selected activation point, and the reed switch 24 will then once again open In order to test the functioning of both the magnet 40 movement and the electrical operation of the reed switch 24, the acceleration of the magnet 40 may be induced and the magnet 40 may be urged to travel toward the second abutment 22 by exerting a repulsive electromagnetic force against the magnet 40. To accomplish this, a trigger voltage is applied through leads 96 to the coil 90 to produce current flow, and the magnet 40 is accelerated to overcome the biasing of the spring 50. As in the case where acceleration of the magnet 40 is caused by a vehicle collision, the passage of the magnet 40 above the contacts 26 and 28 of the reed switch 24 causes the normally open reed switch 24 to close The magnet 40 will continue traversing across the pipe 18 toward the second abutment 22 until a maximum electromagnetic force is experienced by the magnet 40. When the trigger voltage is removed from the coil 90, the spring 50 returns the magnet 40 toward the first abutment 20.

In this manner, the acceleration of the magnet 40 by the application of an electromagnetic force emulates the acceleration of the magnet 40 caused by vehicle collision. The magnetic field can be controlled by the coil current pulse so that the effect of different acceleration forces upon the magnet 40 and the remainder of the shock sensor 10 can be monitored by the application of various electromagnetic forces created by the coil 90. Given proper design consideration, the electromagnetic pulse may move the magnet 40 any amount desired. The testing device 11 may be used to activate the shock sensor at the factory, or it may be incorporated to be a part of the shock sensor 10. In the latter case, the testing can then be performed by the driver of the vehicle. The testing device 11 may be set up so that the driver or user may periodically test the shock sensor 10 by turning a switch of some kind. The testing device 11 may be designed so that testing is automatically performed, e.g., upon the turning of the ignition switch or the starting of the engine. A warning light, such as those that warn of alternator problems or remind one to wear a safety belt, would then be turned on in the event of failure of the shock sensor 10.

The device and method for testing acceleration shock sensors of the present invention is a repeatable method of testing such sensors and provides a means of testing both movement of the magnet 40 and electrical operation of the reed switch 24. The testing is reliable inasmuch as it replicates the acceleration forces that would be applied to the carriage 34 in an actual vehicle collision.

Figure 1:
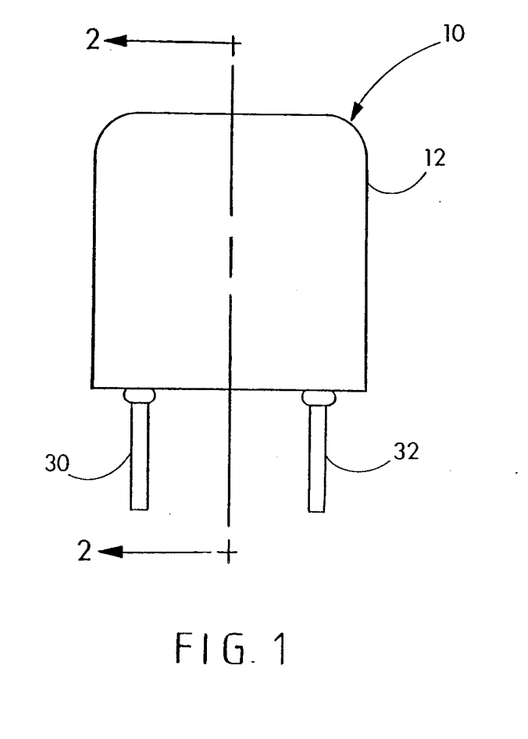
FIG. 1 is a left end view of a shock sensor that utilizes the testing device of the present invention.
Figure 2:
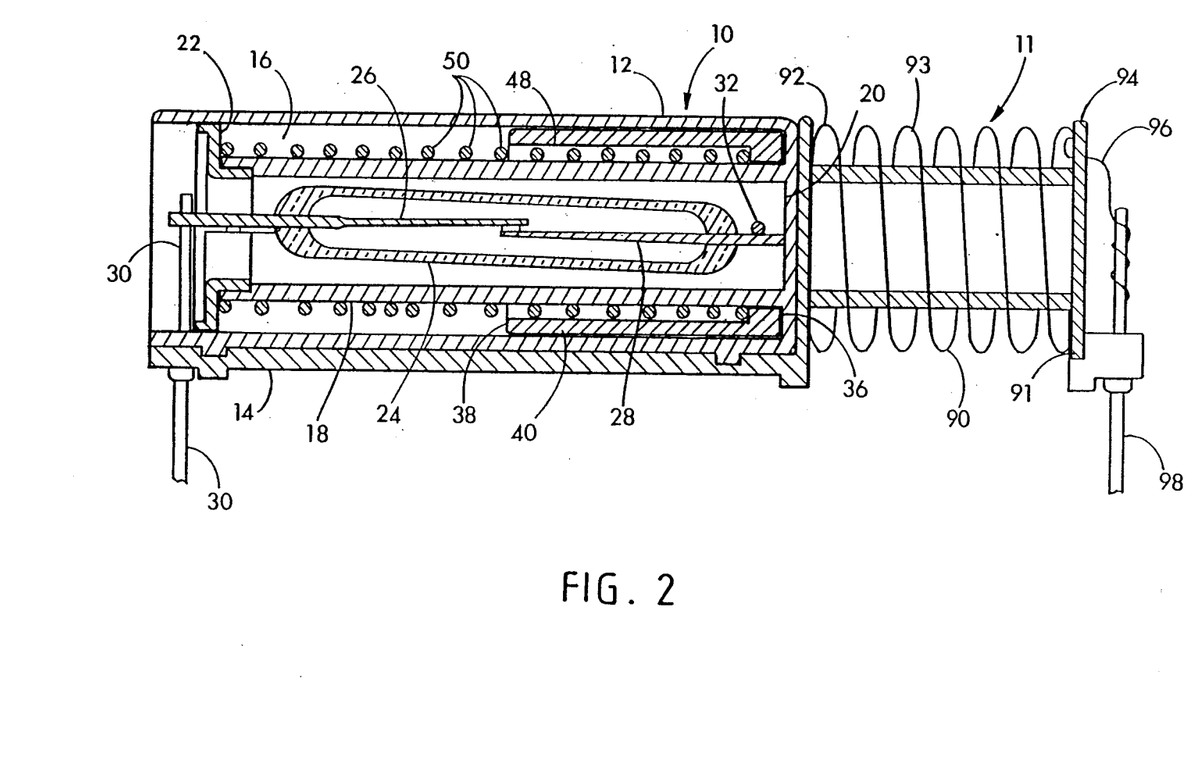
FIG. 2 is a section view of the shock sensor and testing device along section line 2—2 of FIG. 1.
Figure 3:
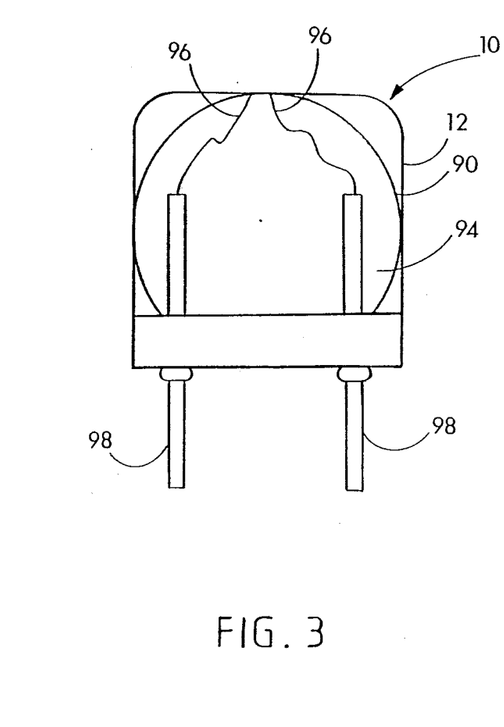
FIG. 3 is a right end view of a shock sensor that utilizes the testing device of the present invention.
Figure 4:
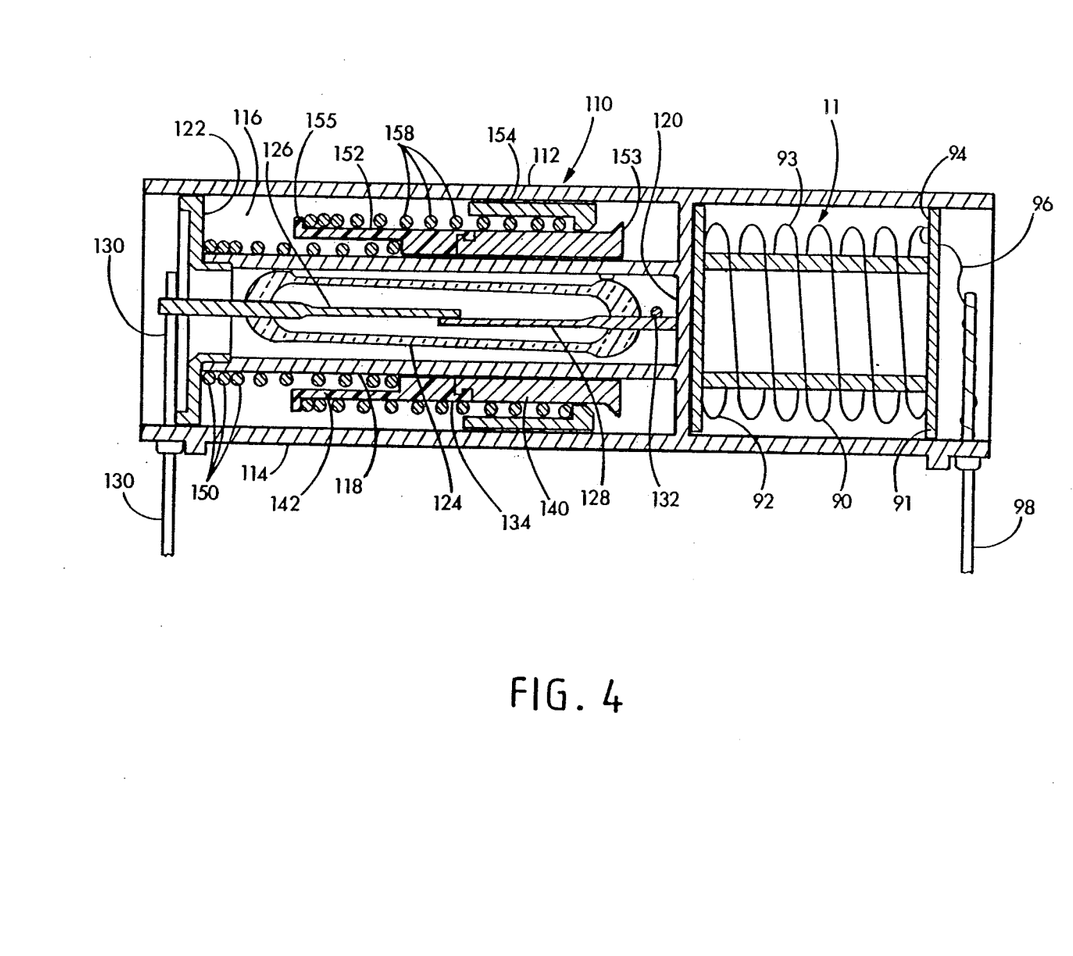
FIG. 4 is a section view of an alternate embodiment that utilizes the testing device of the present invention.

The testing device 11 may also be applicable to alternate arrangements of shock sensors. For example, as depicted in FIG. 4, a shock sensor 110 has a capsule 112, a housing 114, a cavity 116, a pipe 118, a first abutment 120, a second abutment 122, a reed switch 124 having contact blades 126 and 128 and switch terminals 130 and 132, all parts analogous to the shock sensor 10 of FIGS. 1, 2, and 3. The magnet 140 forms a portion of a carriage 134 that travels between the first abutment 120 and the second abutment 122. The carriage comprises a non-magnetic sleeve 142, the magnet 140, and a cradle 152. A first spring 150 fits between the second abutment 122 and the carriage 134 such that a non-magnetic mass 154 may be slidably mounted about the cradle 152 to be capable of travel on the cradle 152 between the first and second walls 153 and 155. The cradle 152 is oriented so that the first wall 153 faces the first abutment 120 and the second wall 155 is opposite the first wall 153. The travel of the non-magnetic mass 154 in the cradle 152 is parallel to the travel of the carriage 134 upon the pipe 18. A second spring fits between the second wall 155 and the non-magnetic mass 154. The structure and operation of the shock sensor 110 is more fully explained in a co-pending application entitled "Extended Dwell Shock Sensing Device," now U.S. Pat. No. 4,877,927. When the carriage 134 is subject to acceleration the shock sensor 111 operates in two stages The first stage is the travel of the carriage 134 from a "rest" position at the first abutment 120 toward the second abutment, and the second stage is the travel of the non-magnetic mass 154 toward the second wall 155. Upon cessation of the acceleration force, the shock sensor 111 returns in reverse sequence back to the rest position. The electromagnetic coil 90 operates in the same way as in the previous embodiment in that an opposing magnetic field induces acceleration in the carriage 134. The electromagnetically induced acceleration pulse would also test response of a subsequent mechanical stage, e.g., the travel of the non-magnetic mass 154 from the first wall 153 toward the second wall, as the pulse declines and the stage action separates. Virtually any inertia or acceleration responsive mechanism linked to the magnet 40 would be activated and could be judged accordingly by its effect on the reed switch.

Figure 5:
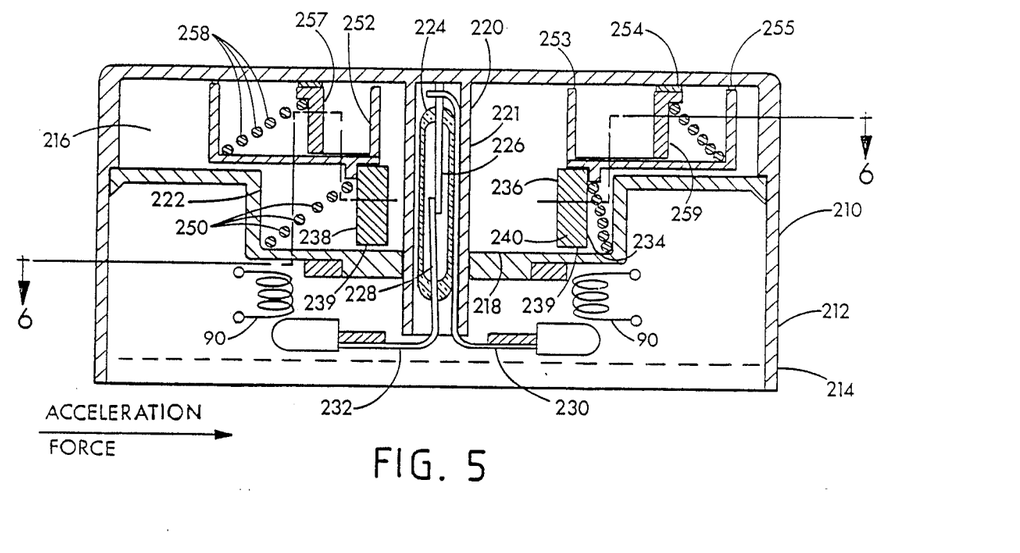
FIG. 5 is a section view of a second alternate embodiment that utilizes the testing device of the present inventon.
Figure 6:
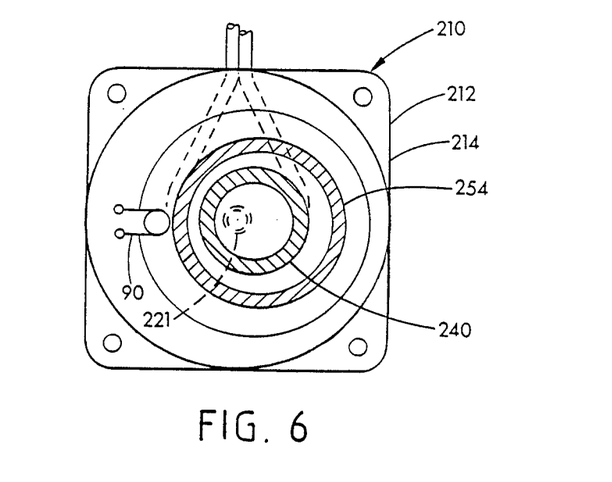
FIG. 6 is a section view of the second alternate embodiment that utilizes the testing device of the present invention along section line 6—6 of FIG. 5.

A second alternate two-stage embodiment in which the testing device 11 may be applicable is a shock sensor 210 depicted in FIGS. 5 and 6. FIG. 5 shows a vertical cross-section through a capsule 212 of the shock sensor 210. The capsule 212 has a housing 214 that defines a cavity 216. The interior of the cavity 216 is bounded by a first abutment 220 formed by the outer margin of a vertical reed switch compartment in the preferred form of a pipe 221, a second abutment 222 formed by the inner diameter of a circumferential wall, and a flat ledge 218 extending between the abutments 220 and 222. Mounted within the vertical pipe 221 is a reed switch 224 having contact blades 226 and 228, normally in the open position. The contact blades 226 and 228 are electrically connected with switch terminals 230 and 232. An annular carriage 234 has an inner diameter 236, an outer diameter 238, and a bottom end 239 such that the bottom end 239 of the carriage 234 is slidably mounted upon the ledge 218 and the inner diameter 236 of the carriage 234 is positioned about the pipe 221. The abutment 220 and the outer diameter 238 of the carriage 234 faces the second abutment 222. The carriage 234 includes and is partially formed by a permanent magnet 240 that moves coincident with the carriage 234. A spring 250 fits between the second abutment 222 and the carriage 234. A circular cradle 252 having a first wall 253 and a second wall 255 is formed within the carriage 234 such that a non-magnetic mass 254 is slidably mounted within the cradle 252 to be capable of travel between the first and second walls 253 and 255. The cradle 252 is oriented so that the first wall 253 faces the first abutment 220 and the second wall 255 is opposite the first wall 253. The non-magnetic mass 254 is annularly shaped and has an inner diameter 257 and an outer diameter 259; the inner diameter 257 fits around the first wall 253. A ring spring 258 fits between the second wall 255 and the non-magnetic mass 254.

The shock sensing device 210, as embodied in FIGS. 5 and 6, is used to sense an acceleration force having a horizontal component. Since the abutments 220 and 222 have circular geometries, the device 210 is sensitive to horizontal forces from any direction, a 360° range. The non-magnetic mass 254 is capable of travel in a direction parallel to and in general alignment with the travel of the carriage 234. The operation of the alternate embodiment 210 is analogous to that of the device 110. The structure and operation of the shock sensor 210 is more fully explained in the co-pending application entitled "Extended Dwell Shock Sensing Device," now U.S. Pat. No. 4,877,927. The device 210 has two stages. The first stage is travel of the carriage 234 from a position such that the inner diameter 236 of the carriage 234 is concentrically positioned about the first abutment 220 to a position such that the inner diameter 236 of the carriage 234 will approach the first abutment 220. The second stage of the travel of the non-magnetic mass 254 is from a position such that the inner diameter 257 of the non-magnetic mass is concentrically positioned about the first wall 253 to a position such that the inner diameter 257 of the non-magnetic mass 254 will approach the second wall 255.

In the application of the testing device 11 to the shock sensor 210, one or more coils 90 that are energized one at a time may be positioned circumferentially beneath the ledge 218 so that they may direct an opposing magnetic field against the magnet 240, thus testing the movement of the carriage 234, the non-magnetic mass 254, and the operation of the reed switch 224.

It is to be understood that the shock sensor 10 as depicted herein is meant to be illustrative of shock sensors that employ magnetic reed switches activated by acceleration or deceleration and the use of the testing device 11 is therefore not restricted to the shock sensor 10 herein disclosed. It is also to be understood that there may be other arrangements for the testing device 11, e.g. the electromagnetic coil 90 may be positioned outside the housing 14 adjacent the second abutment 22 and the poles of the magnet 40 and coil 90 may be oriented so as to provide an attractive force. It is further understood that the invention is not confined to the particular construction and arrangement of parts herein illustrated and described, but embraces all such modified forms thereof as come within the scope of the following claims.

What is claimed is:
1. A shock sensor comprising:
(a) a housing;

(b) a magnet slidably mounted on the housing for travel;

(c) a reed switch mounted on the housing to be responsive to the position of the magnet such that the switch is activated when the magnet travels to a pre-selected activation position during movement of the magnet in response to an acceleration force applied to the housing; and (d) an electromagnetic coil positioned to provide a magnetic field that urges the magnet to travel to the pre-selected activation position in a manner that emulates the acceleration of the magnet induced by rapid deceleration of the shock sensor to confirm the operation of the shock sensor, the electromagnetic coil being located on the housing at a position distant enough from the reed switch such that the reed switch will not be directly activated by energizing the coil.

2. The shock sensor of claim 1 further comprising leads to the electromagnetic coil and wherein the magnetic field of the electromagnetic coil is variable by changing the coil current pulse by application of different trigger voltages through the leads.

3. The shock sensor of claim 1 wherein the electromagnetic coil is a spool having two ends and windings wound circumferentially about the spool, and wherein one end of the spool is positioned perpendicular to the travel of the magnet.

4. The shock sensor of claim 1 wherein the magnetic field of the electromagnetic coil opposes the magnet.

5. The shock sensor of claim 1 wherein the magnet is a tubular magnet slidably mounted on the housing so as to surround the reed switch at the pre-selected position.

6. A testing device for a shock sensor of the type that includes a housing and a magnet slidably mounted on the housing for travel, and a reed switch mounted on the housing to be responsive to the position of the magnet such that the switch is activated when the magnet travels to a pre-selected position during movement of the magnet in response to an acceleration force applied to the housing, the testing device comprising an electromagnetic coil positioned to provide a magnetic field that opposes the magnet such that the magnet is urged to travel to the pre-selected position in a manner that emulates the acceleration of the magnet induced by rapid deceleration of the shock sensor to test the operation of the shock sensor, the electromagnetic coil being located on the housing at a position distant enough from the reed switch such that the reed switch will not be directly activated by energizing the coil.

7. The testing device of claim 6 further comprising leads to the electromagnetic coil and wherein the magnetic field of the electromagnetic coil is variable by changing the coil current pulse by application of different trigger voltages through the leads.

8. The testing device of claim 6 wherein the electromagnetic coil is a spool having two ends and windings wound circumferentially about the spool, and wherein one end of the spool is positioned perpendicular to the travel of the magnet.

9. The testing device of claim 6 wherein the magnetic field of the electromagnetic coil opposes the magnet.

10. A shock sensor comprising:

(a) a housing having a first abutment;

(b) a second abutment of the housing spaced apart from the first abutment a fixed distance;

(c) a magnet having a first end and a second end, the magnet being slidably mounted on the housing to travel between the first abutment and the second abutment and oriented so that the first end of the magnet faces the first abutment and the second end of the magnet faces the second abutment;

(d) means for biasing positioned between the magnet and the second abutment, the magnet being biased away from the second abutment by the biasing means until such time as the magnet is subjected to an acceleration force of pre-selected magnitude;

(e) reed switch mounted on the housing to be responsive to the position of the magnet such that the switch is activated when the magnet reaches a pre-selected activation position during movement of the magnet in response to a pre-selected acceleration force applied to the housing; and (f) an electromagnetic coil positioned to provide a magnetic field that urges the magnet to travel between the first abutment and the second abutment in a manner that emulates the acceleration of the magnet induced by rapid deceleration of the shock sensor to test the operation of the shock sensor, the electromagnetic coil being located on the housing at a position distant enough from the reed switch that the reed switch is not directly activated by energizing the coil.

11. The shock sensor of claim 10 further comprising leads to the electromagnetic coil and wherein the magnetic field of the electromagnetic coil is variable by changing the coil current pulse by application of different trigger voltages through the leads.

12. The shock sensor of claim 10 wherein the means for biasing is a spring.

13. The shock sensor of claim 10 wherein the coil is a spool having two ends and windings about the spool, and wherein one end of the spool is positioned outside of the housing perpendicular to the travel of the magnet.

14. The shock sensor of claim 10 wherein the magnetic field of the electromagnetic coil opposes the magnet.

15. A testing device for a shock sensor of the type that includes a housing having a first abutment, a second abutment of the housing spaced apart from the first abutment a fixed distance, a magnet having a first end and a second end, the magnet being slidably mounted on the housing to travel between the first abutment and the second abutment and oriented so that the first end of the magnet faces the first abutment and the second end of the magnet faces the second abutment, means for biasing positioned between the magnet and the second abutment, the magnet being held away from the second abutment by the biasing means until such time as the magnet is subjected to an acceleration force of pre-selected magnitude, and a reed switch mounted on the housing to be responsive to the position of the magnet such that the switch is activated when the magnet reaches a position during movement of the magnet in response to the pre-selected acceleration force applied to the housing, the testing device comprising an electromagnetic coil positioned to provide a magnetic field that urges the magnet to travel between the first abutment and the second abutment in a manner that emulates the acceleration of the magnet induced by rapid deceleration of the shock sensor, the electromagnetic coil being located on the housing at a position distant enough from the reed switch such that the reed switch is not directly activated by energizing the coil.

16. The testing device of claim 15 further comprising leads to the electromagnetic coil and wherein the magnetic field of the electromagnetic coil is variable by changing the coil current pulse by application of different trigger voltages through the leads.

17. The testing device of claim 15 wherein the means for biasing is a spring.

18. The testing device of claim 15 wherein the coil is a spool having two ends and windings about the spool, and wherein one end of the spool is positioned outside of the housing perpendicular to the travel of the magnet.

19. The testing device of claim 15 wherein the magnetic field of the electromagnetic coil opposes the magnet.

20. A method of testing a shock sensor of the type that includes a housing, a magnet slidably mounted on the housing for travel, and a reed switch mounted on the housing to be responsive to the position of the magnet such that the switch is activated when the magnet travels to a pre-selected position during movement of the magnet in response to an acceleration force applied to the housing, the method comprising the step of applying a magnetic field that opposes the magnet to urge the magnet to travel in a manner that emulates the acceleration of the magnet induced by rapid deceleration of the shock sensor, the electromagnetic field being applied by an electromagnetic coil located on the housing at a position distance enough from the reed switch such that the reed switch will not be directly activated by energizing the coil.

21. The method of claim 20 wherein the shock sensor has leads to the electromagnetic coil and wherein the magnetic field of the electromagnetic coil is varied by changing the coil current pulse by application of different trigger voltages through the leads to test the shock sensor's response to varied accelerations.

22. The method of claim 20 wherein the electromagnetic coil is a spool having two ends and windings wound circumferentially about the spool, and wherein one end of the spool is positioned perpendicular to the travel of the magnet.

23. The method of claim 20 wherein the magnetic field of the electromagnetic coil opposes the magnet.

24. A method of testing a shock sensor of the type that includes a housing having a first abutment, a second abutment of the housing spaced apart from the first abutment a fixed distance, a magnet having a first end and a second end, the magnet being slidably mounted on the housing to travel between the first abutment and the second abutment and oriented so that the first end of the magnet faces the first abutment and the second end of the magnet faces the second abutment, a spring positioned between the magnet and the second abutment, the magnet being biased away from the second abutment by the spring until such time that the magnet is subjected to an acceleration force of pre-selected magnitude, and a reed switch mounted on the housing to be responsive to the position of the magnet such that the switch is activated when the magnet reaches a position during movement of the magnet in response to the pre-selected acceleration force applied to the housing, the method comprising the step of applying a magnetic field that opposes the magnet to urge the magnet to travel between the first abutment and the second abutment in a manner that emulates the acceleration of the magnet induced by rapid deceleration of the shock sensor, the electromagnetic field being applied by an electromagnetic coil located on the housing at a position distant enough from the reed switch such that the reed switch will not be directly activated by energizing the coil.

25. The method of claim 24 further comprising leads to the electromagnetic coil and wherein the magnetic field of the electromagnetic coil is variable by changing the coil current pulse by application of different trigger voltages through the leads.

26. The method of claim 24 wherein the electromagnetic coil is positioned adjacent the first abutment.

27. The method of claim 24 wherein the magnetic field of the electromagnetic coil opposes the magnet.

28. A shock sensor comprising:
 (a) a housing;
 (b) a carriage slidably mounted on the housing for travel and including a magnet portion;
 (c) a non-magnetic mass slidable on the carriage between a first site and a second site on the carriage;
 (d) a reed switch mounted on the housing to be responsive to the position of the magnet such that the reed switch is activated when the magnet travels to a pre-selected activation position during movement of the carriage in response to an initial acceleration force applied to the housing, and the reed switch will remain activated as the non-magnetic mass moves from the first site to the second site in response to an increased acceleration force, then the non-magnetic mass is moved back toward the first site upon cessation of the increased acceleration force, and until the carriage is moved back past the pre-selected activation position;
 (e) an electromagnetic coil positioned on the housing to provide a magnetic field that urges the magnet portion to travel in a manner that emulates the acceleration of the magnet induced by rapid acceleration of the shock sensor to confirm the operation of the shock sensor, the electromagnetic coil being located on the housing at a position distant enough from the reed switch such that the reed switch will not be directly activated by energizing the coil.

* * * * *

UNITED STATES PATENT AND TRADEMARK OFFICE
CERTIFICATE OF CORRECTION

PATENT NO. : 4,980,526

DATED : December 25, 1990

INVENTOR(S) : Reneau

It is certified that error appears in the above-identified patent and that said Letters Patent is hereby corrected as shown below:

Title page, "Reneau" should be -- Reneau et al. --.

Title page, inventor line, "Daniel R. Reneau, Madison, Wis." should be -- Daniel R. Reneau, Madison, Wis.; Alban Bossenmaier, Gaufelden Fed. Rep. Germany; Volker Petri, Aidlingen Fed. Rep. Germany; Egon Katz, Nagold Fed. Rep. Germany; Wolfgang Henseler, Tubingen Fed. Rep. Germany. --

Column 4, line 23, a period should be added after "open".

Column 4, line 36, a period should be added after "close".

Column 5, line 32, a period should be added after "stages".

Signed and Sealed this

Twelfth Day of May, 1992

Attest:

DOUGLAS B. COMER

*Attesting Officer*    *Acting Commissioner of Patents and Trademarks*